United States Patent
Kasai et al.

(10) Patent No.: US 8,418,261 B2
(45) Date of Patent: Apr. 9, 2013

(54) STAGE FOR SCANNING PROBE MICROSCOPY AND SAMPLE OBSERVATION METHOD

(75) Inventors: Nahoko Kasai, Tokyo (JP); Yuichi Harada, Tokyo (JP); Chandra Sekar Ramanujan, Oxford (GB)

(73) Assignees: Nippon Telegraph and Telephone Corporation, Tokyo (JP); Isis Innovation Limited, Oxford (GB)

( * ) Notice: Subject to any disclaimer, the term of this patent is extended or adjusted under 35 U.S.C. 154(b) by 0 days.

(21) Appl. No.: 12/994,581

(22) PCT Filed: Jun. 27, 2008

(86) PCT No.: PCT/JP2008/062118
§ 371 (c)(1),
(2), (4) Date: Nov. 24, 2010

(87) PCT Pub. No.: WO2009/157096
PCT Pub. Date: Dec. 30, 2009

(65) Prior Publication Data
US 2011/0099673 A1    Apr. 28, 2011

(51) Int. Cl.
*G01Q 70/02* (2010.01)
(52) U.S. Cl.
USPC ............................................. 850/9; 850/18
(58) Field of Classification Search ............ 850/9, 1, 850/18
See application file for complete search history.

(56) References Cited

U.S. PATENT DOCUMENTS

| 6,559,458 | B2 * | 5/2003 | Rinn ........................... 250/491.1 |
| 7,193,706 | B2 * | 3/2007 | Woodbury et al. ............ 356/317 |

FOREIGN PATENT DOCUMENTS

| JP | H06-12907 U | 2/1994 |
| JP | 7-260458 A | 10/1995 |
| JP | 08-146300 A | 6/1996 |
| JP | 2004-69428 A | 3/2004 |
| JP | 2005-106790 A | 4/2005 |
| JP | 2006-038947 A | 2/2006 |
| JP | 2007-033198 A | 2/2007 |

OTHER PUBLICATIONS

Notice of Reasons for Rejection, Japanese Patent Application No. 2010-546562, dated Jul. 24, 2012.

* cited by examiner

*Primary Examiner* — Kiet T Nguyen
(74) *Attorney, Agent, or Firm* — Harness, Dickey & Pierce, P.L.C.

(57) ABSTRACT

It is an object of the invention to provide a stage for scanning probe microscopy that can be used in any kind of SPM and can effectively irradiate light to a sample and a solution near the sample without irradiated light blocked by a cantilever. The stage for scanning probe microscopy of the invention is a stage for scanning probe microscopy for fixing a sample substrate that mounts a sample to be observed thereon and has optical transparency and includes an opening that is provided below a portion where the sample substrate is fixed and that has an opening area included within the sample substrate in plan view. Light is irradiated from a bottom surface of the sample substrate onto the sample through the opening.

10 Claims, 9 Drawing Sheets

BOUND LIGAND

FIG. 10

| NAME OF MICROSCOPY | LOCAL PHYSICAL QUANTITY AS DETECTION TARGET |
|---|---|
| STM:SCANNING TUNNELING MICROSCOPY | TUNNELING CURRENT |
| AFM:ATOMIC FORCE MICROSCOPY | INTERMOLECULAR FORCE |
| NSOM:NEAR-FIELD SCANNING OPTICAL MICROSCOPY | NEAR-FIELD LIGHT |
| MFM:MAGNETIC FORCE MICROSCOPY | MAGNETIC FORCE |
| FFM:FRICTION FORCE MICROSCOPY | FRICTIONAL FORCE |
| SNAM:SCANNING NEAR-FIELD ACOUSTIC MICROSCOPY | ULTRASONIC WAVES |
| SICM:SCANNING ION CONDUCTANCE MICROSCOPY | ION CONDUCTION |

STAGE FOR SCANNING PROBE MICROSCOPY AND SAMPLE OBSERVATION METHOD

TECHNICAL FIELD

The present invention relates to a stage for scanning probe microscopy used to fix a sample substrate for mounting a sample thereon in a scanning probe microscopy and a sample observation method using the stage.

BACKGROUND ART

A scanning probe microscopy (hereinafter, referred to as an 'SPM') is a general term for microscopes that observe the three-dimensional shape of a sample surface as physical information of the sample surface with high magnification of nanometer size by scanning the sample surface using a fine probe (cantilever) as a probe. SPMs may be classified into various types of SPMs according to which kind of physical quantity of a sample the probe detects, as shown in FIG. 10.

In addition, the SPMs are very advantageous particularly in the evaluation of a semiconductor device, the evaluation of the quantum structure, and the observation of a biomolecule and are mentioned as observation apparatuses which will develop hereafter. That is, for the semiconductor device, high vertical resolution of the SPM is expected since observation of irregularities of a thin film is required as a thin film technique is developed. In addition, the SPM is used since the electrical property of a semiconductor material in which impurities (dopant atoms) are mixed can be measured with high precision and a distribution situation of the dopant atoms in the semiconductor material can be evaluated.

Furthermore, in evaluation of the quantum structure, the SPM is used as almost a sole observation means for evaluating the quantum structure of each shape of for example, a quantum dot or quantum wire having a size of about 10 nm with high spatial resolution regarding electrical and optical properties. Moreover, in observation of a biomolecule, the SPM can obtain high spatial resolution and does not damage the biomolecule because electron irradiation or observation under vacuum is not performed and accordingly, the biomolecule can be observed in a live state. For the observation of biomolecules, an atomic force microscope (hereinafter, referred to as an 'AFM') and a near-field scanning optical microscope (hereinafter, referred to as an 'NSOM') are especially used, and a range of utilization of these microscopes is expected to extend.

Regarding the observation of biomolecules, by the use of the AFM or NSOM, it became possible to observe how protein moves in an antigen-antibody reaction to change the bond or to observe generation of a force or movement of myosin concerned with muscular contraction and a process of transport of an ATP (adenosine triphosphate) molecule, which is fluorescently labeled, by using protein in a live state. On the other hand, in the case of the AFM, not only two-dimensional imaging indicating the height and hardness of a sample can be performed by contact, dynamic, and phase modes, but also controls of force modulation, a magnetic force (MFM), a current, a surface potential (KFM), nanoindentation for making a hole in a sample in a nanometer size, the atmosphere can be comparatively easily performed. In addition, since there is no limitation in a sample, a biological sample can also be measured.

However, even in the case of SPMs, a large apparatus needs to be remodeled in order to change the environment around a sample, especially an optical environment. This was a big problem in terms of both cost and remodeling time. For this reason, there was almost no technique allowing light to be irradiated onto a sample in the SPM. On the other hand, since irradiation of light onto a sample has been generally performed in an optical microscope until now, a function of light irradiation for dissociating a caged compound is typically mounted as an additional function of a microscope commercially available.

Here, the caged compound refers to a compound which confines a material, which gives the activity, with another molecule, which reacts to light (light having a specific wavelength), as a method of controlling the activity in a biomolecule, for example. Specifically, the caged compound indicates a compound obtained by bonding a photodissociable protecting group, such as a nitrobenzene group, to a bioactive material in order to control the activity of the bioactive material. That is, the bioactive material is in a physiologically inactive state when the bioactive material is bonded to the photodissociable protecting group. However, the state of the bioactive material can be changed to an active state by dissociating the bonding between the bioactive material and the photodissociable protecting group by irradiation of ultraviolet rays and the like, and drug stimulation can be given to a biomolecule by the bioactive material.

That is, the composition of molecules included in a solution can be changed by irradiating light onto the caged compound. Accordingly, for example, an operation of giving drug stimulation can be performed on a cell at a required timing. Since a laser beam is irradiated as the light described above, it is necessary to dispose optical components, such as an optical path, a condensing lens, and an iris with high precision.

Furthermore, since a device of the SPM is expensive, many researchers share one SPM in many cases. For this reason, the device should be simply installed and detached, but there have been no such optical devices. A method of directly irradiating light from the outside, for example, with a laser using an optical fiber may also be considered. Also in this case, an adjustment of an optical axis of a laser beam is complicated and the system size becomes large. Accordingly, it is not possible to easily detach the device from the SPM.

Regarding irradiation of light onto the sample described above, a high-speed atomic force microscope has been newly developed, being provided as an SPM capable of performing irradiation of light onto a sample (for example, refer to JP-A-2005-106790). The technique of irradiation of light onto a sample disclosed in JP-A-2005-106790 is applied to a case where an optical microscope is combined to the SPM. Accordingly, the technique is based on a light irradiation technique using an optical microscope in the related art, and reaction caused by the light irradiation is restricted to a case of using a caged compound.

In the SPM disclosed in JP-A-2005-106790, a scanning mechanism that relatively scans a cantilever existing in a solution and a substrate, on which a sample is mounted, in a state where the sample is dipped in the solution and an irradiation mechanism that irradiates release light to a photodissociable protecting group of a caged compound existing in the solution or in the sample are provided. However, the irradiation mechanism in the SPM is formed integrally with the device of the SPM and has a large-scale, expensive, and complicated system configuration. Since the irradiation mechanism is united with the device of the SPM, the irradiation mechanism cannot be shared for other SPMs, which is a disadvantage. Furthermore, in the case of the SPM described above, since a cantilever exists between a light source and a sample when irradiating light onto a solution near the sample, the light is blocked by the cantilever. As a result, irradiation of light cannot be effectively performed on the sample or the solution, onto which the light needs to be irradiated most, located below the cantilever.

DISCLOSURE OF INVENTION

The invention has been finalized in view of the drawbacks inherent in the related art, and it is an object of the invention to provide a stage for scanning probe microscopy that can be used in any kind of SPM and can effectively irradiate light to a sample and a solution near the sample without irradiated light being blocked by a cantilever.

According to an aspect of the invention, a stage for scanning probe microscopy for fixing a sample substrate that mounts a sample to be observed thereon and has optical transparency includes an opening that is provided below a portion where the sample substrate is fixed and that has an opening area included within the sample substrate in plan view. Light is irradiated from a bottom surface of the sample substrate onto the sample through the opening.

In the stage for scanning probe microscopy according to the aspect of the invention, preferably, a light irradiating portion that irradiates the light having a wavelength which affects the sample is provided within the opening.

In the stage for scanning probe microscopy according to the aspect of the invention, preferably, the light irradiating portion has a light source.

In the stage for scanning probe microscopy according to the aspect of the invention, it is preferable to further include: a light source portion configured to include a plurality of light sources that emit light components having different wavelengths; and a waveguide corresponding to light having each wavelength from the light source portion. Each waveguide is combined with the light irradiating portion, and the light sources are ON/OFF controlled to irradiate the light having a desired wavelength onto the sample.

In the stage for scanning probe microscopy according to the aspect of the invention, preferably, light is irradiated from the light irradiating portion using an LED as a light source.

In the stage for scanning probe microscopy according to the aspect of the invention, preferably, a battery connected to the light source by a wiring line is provided, as a power source of the light source, at the position distant from the stage for scanning probe microscopy.

In the stage for scanning probe microscopy according to the aspect of the invention, preferably, the sample substrate is a mica substrate According to another aspect of the invention, a sample observation method of fixing a sample substrate, which mounts a sample to be observed thereon and has optical transparency, to a stage for scanning probe microscopy and observing the sample with a scanning probe microscopy includes irradiating light from a bottom surface of the sample substrate onto the sample through an opening that is provided below a portion where the sample substrate is fixed and that has an opening area included within the sample substrate in plan view.

In general, observation of a sample is performed by mounting biomolecules on a sample substrate formed of for example, mica, which is flat at an atomic level, on slide glass serving as a sample stage. According to the invention, the stage for scanning probe microscopy, the sample, and the sample substrate (platform) are configured to be unified by the configuration described above. Accordingly, since a function of light irradiation can be given to the sample stage itself, it becomes possible to directly fix the sample substrate on a light irradiation base. This allows light to be easily irradiated from the bottom surface of the sample substrate.

Furthermore, as described above, since the stage for scanning probe microscopy, the sample, and the sample substrate (platform) are configured to be unified in the stage for scanning probe microscopy according to the invention, the stage for scanning probe microscopy can be easily attached to or detached from a SPM. As a result, the stage for scanning probe microscopy can be commonly used in a plurality of SPMs. Furthermore, according to the invention, since light irradiation from the bottom surface of the sample substrate is performed, it is possible to perform SPM observation in the related art by placing the sample substrate below the cantilever of the SPM. Furthermore, according to the invention, the shape and material (in addition to glass, a change to plastic or metal is easy) which were difficult in the related art can be used. For example, a cylindrical plate or a plate with a hole opened may be used as a sample stage. Accordingly, versatility and operability are improved.

Furthermore, according to the invention, by providing the stage for scanning probe microscopy instead of a slide glass generally used as a stage for scanning probe microscopy of an SPM currently used, a function of performing light irradiation from a lower portion of the sample substrate can be provided with a simple and cheap configuration (the SPM is very expensive and it imposes a large burden on a purchaser to buy the SPM again. In addition, attachment of the SPM is also expensive).

In addition, according to the invention, since a plurality of light sources (LEDs) corresponding to light components with wavelengths required for an experiment are provided, light (from an infrared ray to ultraviolet light) with a desired wavelength used for a sample to be observed can be easily irradiated by changing a light source. Furthermore, according to the invention, the versatility is improved since a simple structure is used without using various optical components, unlike the related art. In addition, since the structure is simple as compared with the related art, it does not easily break. Furthermore, according to the invention, unlike a laser light source in the related art, a battery, such as a dry cell or a secondary battery, is used without generating a DC voltage from an AC power source as power of a light source. Accordingly, since an electromagnetic noise originating from a power source can be suppressed, an increase in a measurement noise in the SPM can be prevented by suppressing the measurement noise to a minimum.

BRIEF DESCRIPTION OF THE DRAWINGS

FIG. 10 is a table illustrating a microscope name classified as an SPM and the local physical quantity to be detected in each microscope.

BEST MODE FOR CARRYING OUT THE INVENTION

First Embodiment

Figure 1:
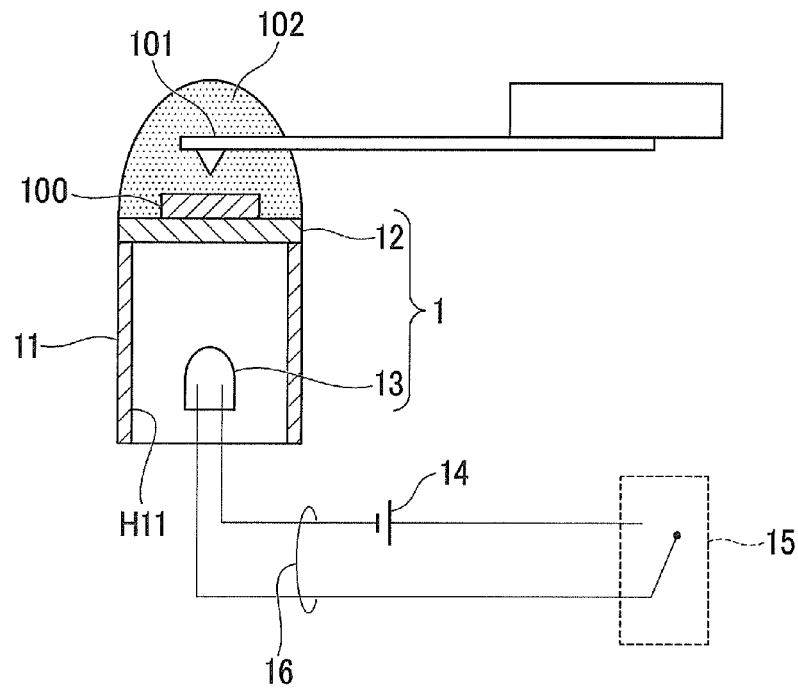
FIG. 1 is a view illustrating an example of the configuration of a stage for scanning probe microscopy according to a first embodiment of the invention.

Hereinafter, a stage for scanning probe microscopy according to a first embodiment of the invention will be described with reference to the accompanying drawings. FIG. 1 is a block diagram illustrating an example of the configuration of a stage for scanning probe microscopy according to the first embodiment. Referring to FIG. 1, a stage for scanning probe microscopy 1 is configured to include: a container 11 that has a cylindrical shape with a hole H11 and has an opening in an upper portion (surface on a side where a sample substrate 12 to be described later is disposed) of a tube; the sample substrate 12 that is a planar substrate which is provided on the upper portion of the hole H11 in the container 11 in the axial direction of the tube such that the substrate surface is perpendicular to the axial direction, serves to fix a sample 100 to be observed on an upper surface thereof, and is formed of mica, for example; a light source 13 that irradiates light, which has a wavelength set beforehand, from the bottom surface direction of the sample substrate 12 to the sample; a power source 14 of the light source 13; and a switch 15 that switches between ON (irradiation of light) and OFF (no irradiation of light) of the light source 13.

The light source 13 is an LED, for example, is provided in a lower portion of the sample substrate 12 within the container 11, and irradiates light from a bottom surface of the sample substrate 12 to the sample 100 on a top surface of the sample substrate 12. The power source 14 (for example, a battery) of the light source 13 and the switch 15 which performs an ON/OFF control of the light source 13 are disposed at positions outside the container 11, which are distant from a measurement place, and are connected to the light source 13 in the container 11 by wiring lines 16 (for example, thin electric wires), such that vibration and noises when turning on or off the switch 15 are not given to a measurement system of the SPM. The sample 100 is dipped in a solution 102 adhered on the sample substrate 12 due to the surface tension. In addition, when this sample 100 is observed, a cantilever 101 which is a probe of the SPM is provided in a state close to the sample 100 in the solution 102.

In a sample observation method of the SPM in the present embodiment, a change of the sample 100 is measured by fixing the sample substrate 12 which fixes the sample 100 thereon to an upper opening of the container 11 and irradiating light of the light source 13 from the bottom surface side of the sample substrate 12. Thus, according to the present embodiment, the light is irradiated onto the sample 100 from a side opposite the cantilever 101. Therefore, unlike the related art, light from the light source 13 is not blocked and a sufficient amount of light can be irradiated onto the sample 100.

In addition, a smaller stage for scanning probe microscopy than that in the related art can be configured by using an LED as the light source 13 and using a battery (small battery, such as a button battery) as the power source 14. In addition, unlike the related art, a mechanism for irradiating light onto the sample in the present embodiment is not fixed to a main body of the SPM. Accordingly, the light irradiating mechanism can be easily attached to or detached from an SPM commercially available, as a stage for scanning probe microscopy. In addition, by configuring the stage for scanning probe microscopy in the same shape as stages for scanning probe microscopy of other SPMs commercially available, an exchange can be easily performed. As a result, attaching and detaching can be performed quickly and accordingly, and the stage for scanning probe microscopy can be commonly used in a plurality of SPMs. As the sample substrate 12, only a mica substrate which fixes the sample 100 thereon may be used or that obtained by fixing the mica substrate on an upper surface of a substrate formed of a material having optical transparency, such as slide glass.

Figure 2:
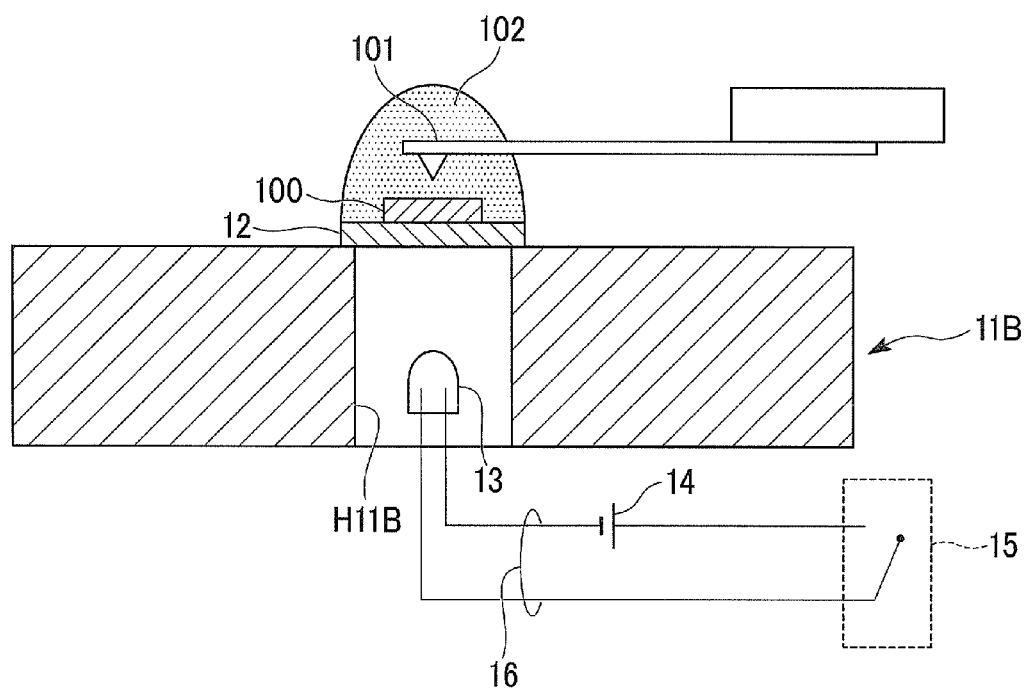
FIG. 2 is a view illustrating an example of another configuration of the stage for scanning probe microscopy according to the first embodiment of the invention.

Furthermore, a tube (having the hole H11) having an opening, in which a surface at the position where the sample substrate 12 is disposed is opened, may be used as the container 11 as shown in FIG. 1 or a plate 11B having a hole H11B with an opening provided on a surface at the position where the sample substrate 12 is placed may be used as shown in FIG. 2. The sample substrate 12 is disposed to overlap the opening of the hole H11 of the tube or the opening of the hole H11B of the plate 11B in plan view (when viewed in parallel to the depth direction of a hole). In addition, the area of the sample substrate 12 in plan view is set to be greater than or equal to the opening area of the opening of each of the hole H11 and the hole H11B in plan view. The hole H11B is formed in a direction perpendicular to a surface of the plate 11B. The openings of the hole H11 and hole H11B and the inside light source 13 form a light irradiating portion 20 that irradiates light onto the sample 100.

Furthermore, in the case shown in FIG. 2, a stage for scanning probe microscopy 1 is configured to include: a plate 11B that has a planar substrate shape with a hole H11B and has an opening in an upper portion (surface on a side where the sample substrate 12 to be described later is disposed) of the hole H11B; the sample substrate 12 that is a planar substrate which is provided on an upper portion of a tube, which is formed by an inner peripheral surface of the hole H11B in the plate 11B, in the axial direction thereof such that the substrate surface is perpendicular to the axial direction, serves to fix the sample 100 to be observed on an upper surface thereof, and is formed of mica, for example; a light source 13 that irradiates light, which has a wavelength set beforehand, from the bottom surface direction of the sample substrate 12 to the sample through the hole H11B; a power source 14 of the light source 13; and a switch 15 that switches between ON (irradiation of light) and OFF (no irradiation of light) of the light source 13. In addition, glass, acrylic, metal, and the like may be used as a base material for forming the container 11 and the plate 11B.

Since the sample substrate 12 on which the sample is fixed is disposed on the opening of the hole H11 of the container 11 or the opening of the hole H11B of the plate 11B and the light source 13 is disposed below the sample substrate 12 within the hole H11 or the hole H11B, light is irradiated onto the sample 100 from a direction opposite the cantilever 101. Therefore, as already described above, light irradiated from the light source 13 is not blocked by the cantilever 101 and a sufficient amount of light can be irradiated onto the sample 100. In addition, if a material having high light reflectance, such as metal, can be used as a base material for forming the container 11 and the plate 11B, it is possible to increase the intensity of light irradiated onto the sample 100 from a bottom surface of the sample substrate 12 placed on the opening of the container 11 or the plate 11B.

Since the switch 15 which performs the ON/OFF control of the light source 13 is provided at the end of the wiring line 16, mechanical vibration generated when touching a switch does not cause any trouble in measurement, and irradiation of light can be easily performed at the necessary timing during the measurement. In addition, since a battery is used, a DC voltage is not generated from an AC power source by a regulator, for example. Accordingly, noise caused by the emission of light of the light source 13 and the measurement system can be suppressed, causing no problems in observation.

Furthermore, the wavelength of light irradiated to a sample or a solution near the sample can be easily changed by using an LED (light emitting diode) or a laser diode as the light source 13. Accordingly, the influence of various lights on other kinds of samples can be observed by changing the LED or the laser diode to that of the required wavelength. For example, as wavelengths of the LED, there are wavelengths corresponding to infrared light to UV (ultraviolet) light, and the wavelength of light emitted is determined by a semiconductor material. The wavelength range of LEDs commercially available is 360 nm to 1550 nm in many cases. Furthermore, in the case of emitted light of the LED, a luminescent color is a single color, that is, the wavelength range is narrow, unlike sunlight or an electric lamp. Accordingly, only light with a required wavelength can be irradiated onto a sample. Moreover, in addition to LEDs that emit light (visible light) having a wavelength in a range of about 380 nm to 780 nm (approximately, 450 nm in the case of a blue color, 520 nm in the case of a green color, 590 nm in the case of a yellow color, and 660 nm in the case of a red color) which is visible to human beings, many LEDs that emit ultraviolet light (ultraviolet ray) having a wavelength shorter than 380 nm and infrared light (infrared ray) having a wavelength exceeding 780 nm also exist.

As described above, by using LEDs having different wavelengths and adopting the configuration where light is not blocked by the cantilever, deterioration of a material of a sample to be observed may also be observed on a nanometer scale. For example, it also becomes possible to observe how harmful UV light acts and affects a biological sample with a nanometer size.

Figure 3A:
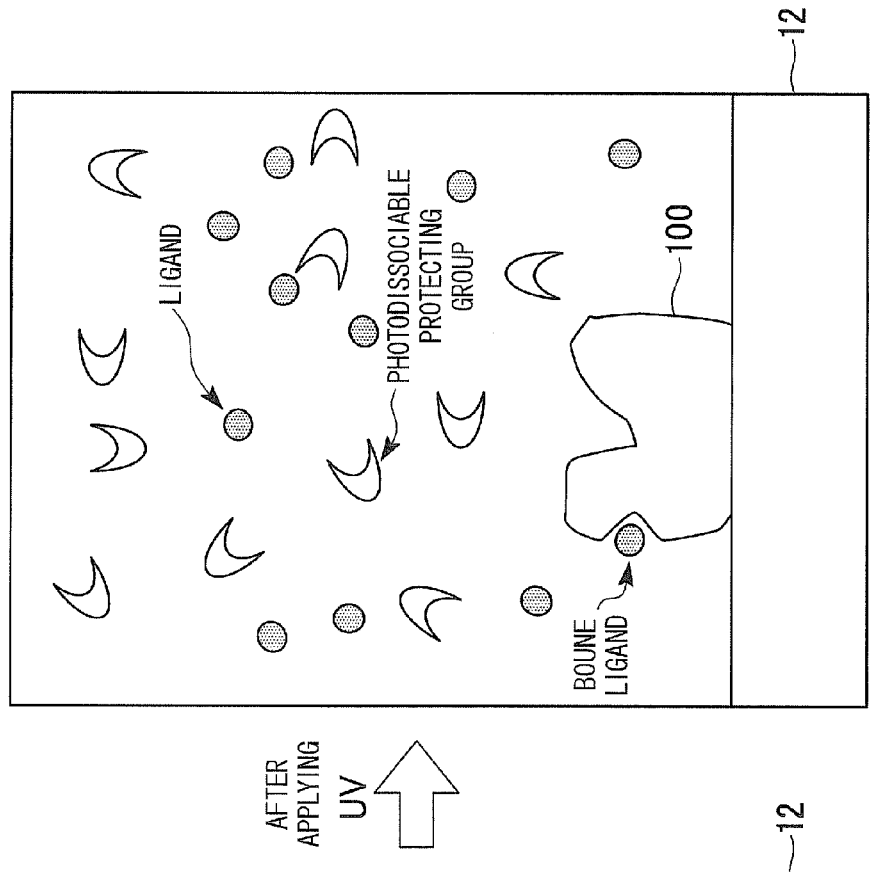
FIGS. 3A and 3B are conceptual views showing a caged compound in which a bioactive material and a photodissociable protecting group, which deactivates the bioactive material, are bonded to each other.
Figure 3B:
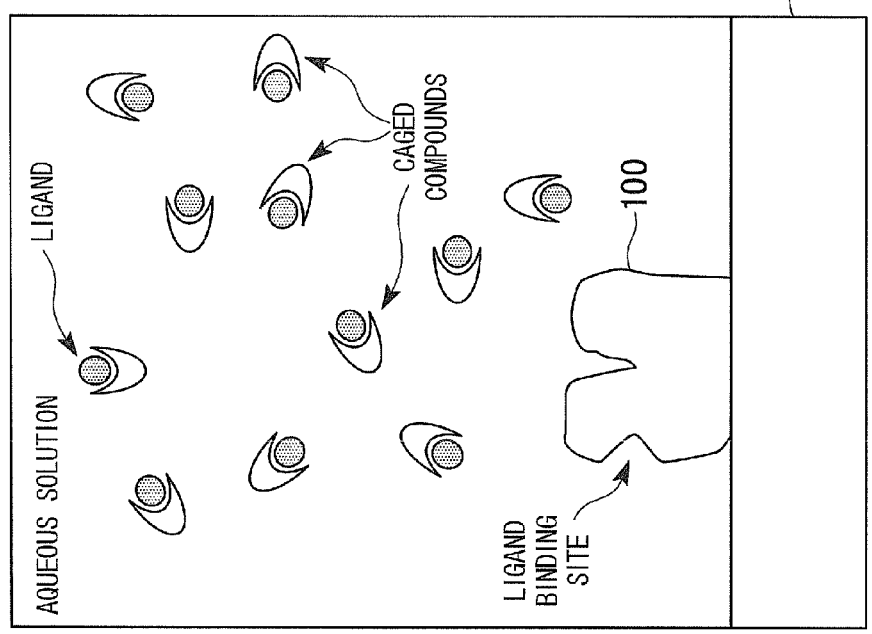

In addition, as shown in FIGS. 3A and 3B, it is also possible to dissociate a caged compound by irradiation of UV light. FIG. 3A illustrates that ligand is bonded to a photodissociable protecting group to become a caged compound, resulting in a physiologically inactive state with respect to the sample 100. Here, FIGS. 3A and 3B are conceptual views illustrating receptor protein of the sample 100 which is fixed on the sample substrate 12 and is active in the solution 102. On the other hand, FIG. 3B illustrates a state where ligand, that is, a material that is bonded to receptor protein to become active, or a material that suppresses the activity is separated from a photodissociable protecting group by irradiating UV light, resulting in a bioactive state bonded to the sample 100 (for example, receptor protein).

Here, the caged compound refers to a compound which confines a material (ligand), which gives the activity, with another molecule, which reacts to light having a specific wavelength, as a method of controlling the activity in a biomolecule. Specifically, the caged compound indicates a compound obtained by bonding a photodissociable protecting group, such as a nitrobenzyl group, to ligand, that is, a bioactive material. Therefore, the ligand is physiologically inactive in a state where the photodissociable protecting group is bonded to the ligand, but the state of the ligand can be changed to a bioactive state by dissociating the bonding between the ligand and the photodissociable protecting group by irradiation of UV light. As a result, drug stimulation can be given to a biomolecule at an arbitrary timing.

As shown in FIG. 3A, the caged compound is contained in the solution 102 and there is a site (ligand binding site), to which ligand is bonded, in the receptor protein. However, the caged compound on its own is not bonded to the ligand binding site. In addition, by irradiating UV light to the solution 102, the caged compound in the solution 102 is dissociated to thereby discharge the ligand into the solution 102, as shown in FIG. 3B. As a result, since the ligand is bonded to the ligand binding site of receptor protein, the shape of the receptor protein is changed due to the drug stimulation that the receptor protein receives.

In the case of dissociating a caged compound by the use of UV light, various kinds of stimuli may be given depending on the kind of ligand that forms a caged compound. Examples of ligand include ATP (Adenosine TriPhosphate), AMP (Adenosine MonoPhosphate), GTP (Guanosine TriPhosphate), GMP (Guanosine MonoPhosphate), glutamic acid, Ca2+, and an inositol phosphoric acid. Moreover, in the case where the UV light is used and the caged compound is not used, the response excited by photoreaction can be observed in a nanometer level. For example, applications to molecular level observation of deterioration caused by UV light, molecular structure observation of protein related to photosynthesis performed by visible light, and a structural change of polymer, such as a light curing resin, caused by light may be made.

In addition, by using cleaved mica for the sample substrate 12, it is possible to easily obtain a transparent (light transmissive) substrate, which has a smooth flat surface without contamination in an atomic level, as the sample substrate 12 each time (whenever a sample is observed). In addition, a change in an electrical property caused by light irradiation may also be monitored by coating a metal, such as ITO (Indium Tin Oxide), on a mica surface. The configuration described can be easily used in the same manner in any kind of SPM. In addition, in configurations where the temperature of the sample substrate 12 can be changed, the sample can be observed at various temperatures in the stage for scanning probe microscopy. In this case, in order to change the temperature of the sample substrate 12, there are methods such as warming, by building a heater into the sample substrate 12, cooling by building a peltiert device into the sample substrate 12, and circulation of a solvent of glycerol and the like through a tube in close contact with the sample substrate 12 that can be used.

Second Embodiment

The configuration in which only one LED is used may be adopted as described in the first embodiment, but a configuration in which one of a plurality of LEDs is selected according to the wavelength used and light having an arbitrary wavelength is irradiated onto the sample 100 may also be adopted like a second embodiment. Moreover, in the second embodiment, it may be possible to use a configuration in which the plurality of LEDs are sequentially selected one by one and a plurality of light beams having different wavelengths are irradiated onto the sample 100 in a time-sequential manner such that a change corresponding to a wavelength may be observed.

Figure 4A:
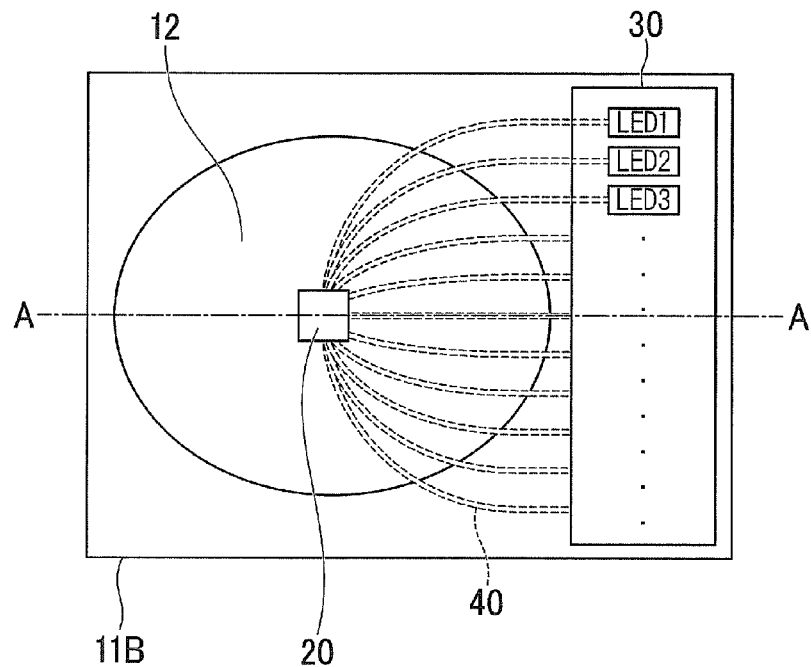
FIGS. 4A to 4C are views illustrating an example of the configuration of a stage for scanning probe microscopy according to a second embodiment of the invention.
Figure 4B:
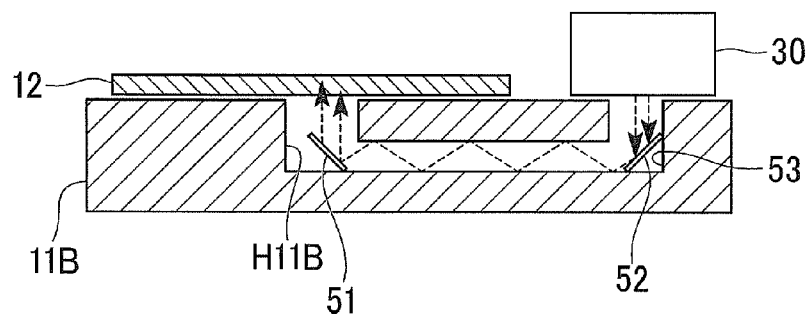
Figure 4C:
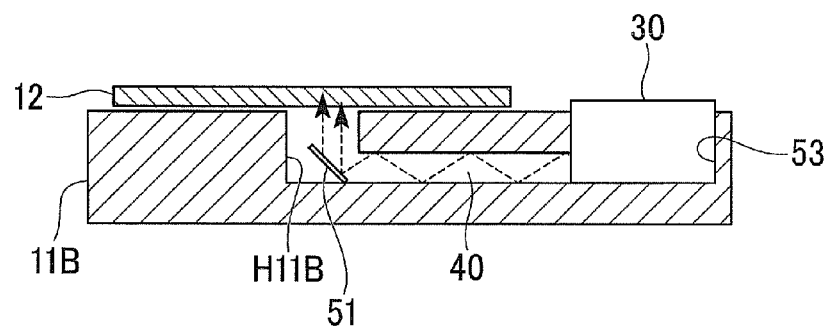

FIGS. 4A to 4C illustrate that an LED box 30 where a plurality of LEDs (LED1, LED2, LED3, . . . ), from which light beams having different wavelengths are emitted, are built is provided in a stage for scanning probe microscopy according to the second embodiment. FIG. 4A is a top view illustrating the stage for scanning probe microscopy according to the present embodiment, and FIGS. 4B and 4C are cross-sectional views taken along the lines A-A of FIG. 4A. Also in the present embodiment, the cantilever 101 shown in FIGS. 1 and 2 is provided at a position opposite an upper surface (surface of an upper portion of the sample substrate 12 shown in FIGS. 4B and 4C) of the sample substrate 12. Therefore, since light irradiated onto the sample 100 is irradiated from a bottom surface of the sample substrate 12 onto the sample 100 through a hole H11B, the light is not blocked by the cantilever 101 in the same manner as in FIGS. 1 and 2.

In the configuration shown in FIGS. 4A to 4C, the LED box 30 is disposed at the position distant from the sample substrate 12 and light emitted from each LED is guided to the hole H11B through an optical fiber using an optical waveguide 40 (for example, a slab type waveguide) corresponding to each LED and is then reflected by a mirror 51, such that the light emitted from each LED is irradiated onto the sample 100. Although not shown in the drawings, in each LED, a power source 14 and a switch 15 that controls whether to supply driving power from the power source 14 are provided at positions distant from the stage for scanning probe microscopy in the same manner as in FIG. 1 or 2. Light having an arbitrary wavelength can be irradiated onto the sample 100 by turning on/off the switch 15 of each LED.

In the configuration shown in FIG. 4B, the LED box 30 is disposed on an upper surface of the plate 11B, and a hole 53 is provided below the LED box 30 disposed, and a mirror 52 is provided in a bottom portion of the hole 53 for every LED. Light is emitted from each LED to the mirror 52 through the optical fiber. In addition, for every mirror 52, the optical waveguide 40 is provided between the hole 53 and the hole 11B corresponding to the LED. Light that each LED of the LED box 30 emits is incident on the mirror 52 provided for every LED of the LED box 30 and is then emitted to the optical waveguide 40. Then, the light emitted from each optical waveguide 40 is reflected by the mirror 51, which is provided in a bottom portion of the hole H11B for every optical waveguide 40, and is then emitted to the sample 100. That is, the light emitted from each LED to the sample 100 is irradiated from the lower portion of the sample substrate 12.

Furthermore, in the configuration shown in FIG. 4C, the LED box 30 is disposed within the hole 53, and light emitted from each LED is directly incident on the optical waveguide 40 corresponding to the LED. Then, the light emitted from each optical waveguide 40 is reflected by the mirror 51, which is provided in the bottom portion of the hole H11B for every optical waveguide 40, and is then emitted to the sample 100, such that the light emitted from each LED is irradiated onto the sample 100. That is, the light emitted from each LED to the sample 100 is irradiated from the lower portion of the sample substrate 12.

In FIGS. 4B and 4C, the opening of the hole H11B described above and the mirror 51 positioned in the bottom portion of the hole H11B form the light irradiating portion 20 serving to irradiate light onto the sample 100. Then, the light emitted from each optical waveguide 40 is emitted to the sample 100 by the mirror 51, which is provided in the bottom portion of the hole H11B for every optical waveguide 40. In addition, by turning on an LED corresponding to a wavelength required for observation of a sample by making a selective ON/OFF control using the outside switch 15, the light from the opening of the hole H11B can be irradiated onto the sample. Since the sample 100 can be placed on the periphery including a portion where light is irradiated, it is possible to irradiate light from the lower portion of the sample substrate 12 while making an observation from the upper portion of the sample 100 with the cantilever 101.

Furthermore, as described above, the optical waveguide 40 may be built within the stage for scanning probe microscopy or be provided on a stage surface as long as a mechanism in which light is irradiated from the lower portion of the sample substrate 12 onto the sample 100 is eventually obtained. The optical waveguide 40 needs to be formed of a material allowing propagation of light with a desired wavelength, which is emitted from an LED corresponding to each optical waveguide 40, so as not to attenuate. Although not shown in FIGS. 4A to 4C, the power source 14 or the switch 15 may also be placed to be distant from the stage for scanning probe microscopy in the same manner as in the first embodiment. In addition, regarding which LED in the LED box 30 is to be selected, a program for sequence control may be created beforehand so that the switch 15 can be automatically controlled by operating a computer using the program.

Since the light source 13 is distant from the sample substrate 12, noise can be avoided more efficiently. In addition, by the size of the opening of the hole H11B, irradiation of light onto the sample substrate 12 over a wide or narrow range (i.e., an irradiated region) can be controlled. Although a plurality of LEDs are disposed in the LED box 30 in the above description, it is also possible to dispose only one LED in the LED box 30 and to use only one wavelength in the same manner as in the first embodiment.

Figure 5A:
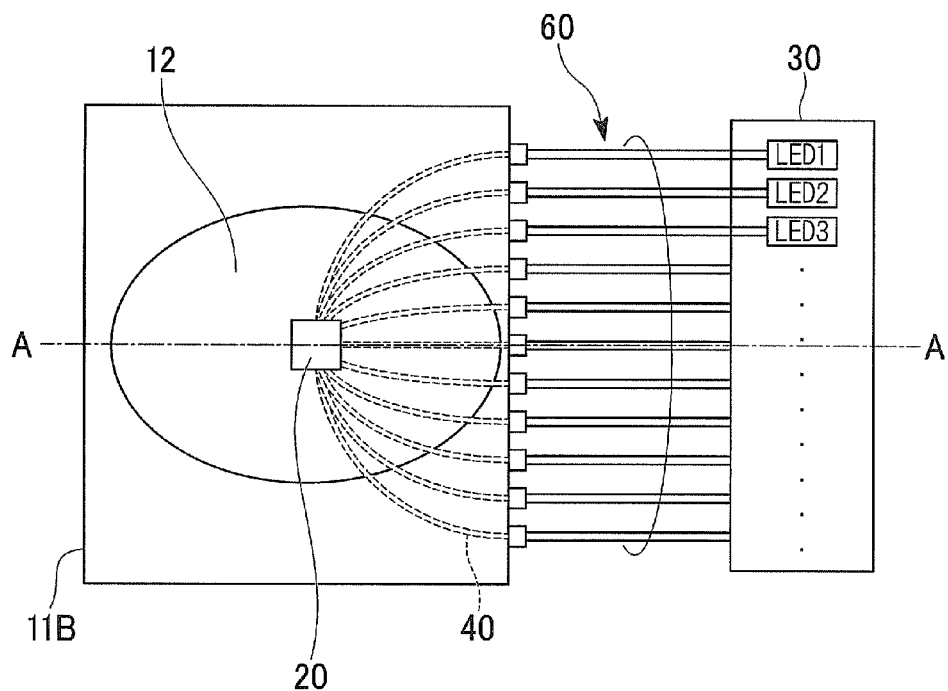
FIGS. 5A and 5B are views illustrating an example of another configuration of the stage for scanning probe microscopy according to the second embodiment of the invention.
Figure 5B:
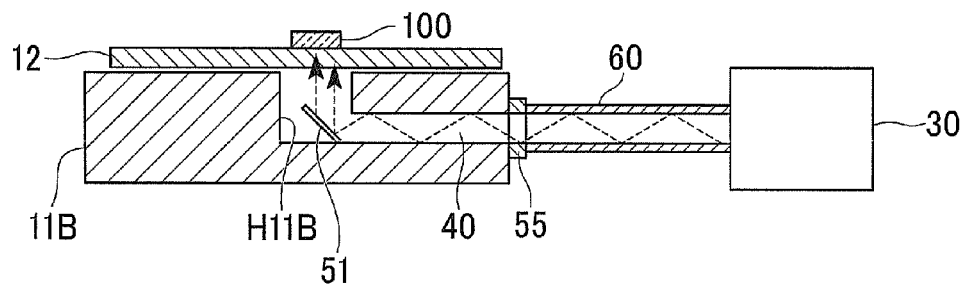

Next, FIGS. 5A and 5B illustrate that the LED box 30 is disposed at the position distant from a stage body for scanning probe microscopy and light emitted from each LED is incident on an optical fiber 60 corresponding to each LED. In addition, each optical fiber 60 is connected to the optical waveguide 40, which is provided for every optical fiber 60, using an optical connector 55. FIG. 5A is a top view illustrating a stage for scanning probe microscopy having another configuration according to the present embodiment, and FIG. 5B is a cross-sectional view taken along the line A-A of FIG. 5A. The optical waveguide 40 is provided with a light receiving port, that is, a connecting portion for connecting the optical connector 55 on a side surface of the plate 11B.

In the configuration shown in FIGS. 5A and 5B, the opening of the hole H11B described above and the mirror 51 positioned in the bottom portion of the hole H11B form the light irradiating portion 20 serving to irradiate light onto the sample 100. Also in the present embodiment, the cantilever 101 shown in FIGS. 1 and 2 is provided at the position opposite the upper surface (surface of the upper portion of the sample substrate 12 shown in FIG. 5B) of the sample substrate 12. Therefore, since light irradiated onto the sample 100 is irradiated from the bottom surface of the sample substrate 12 onto the sample 100 through the hole H11B, the light is not blocked by the cantilever 101 in the same manner as in FIGS. 1 and 2.

Light emitted from each LED of the LED box 30 is irradiated onto the sample 100 from the lower direction of the sample substrate 12 through the optical fiber 60, the optical connector 55, and the minor 51. The mirror 51 is provided for each optical waveguide 40 in the same manner as the configuration shown in FIGS. 4A to 4C. The light emitted from each LED of the LED box 30 is incident on the optical waveguide 40 through the optical fiber 60 and the optical connector 55. Light emitted from the optical waveguide 40 corresponding to each LED is reflected by the mirror 51 and is then irradiated from the bottom surface of the sample substrate 12 to the sample 100 through the hole H11B. Although not shown in the drawings, in each LED, the switch 15 that controls whether to supply driving power from the power source 14 is provided in the same manner as in FIG. 1 or 2. Light having an arbitrary wavelength can be irradiated onto the sample 100 by turning on/off the switch 15 of each LED. The power source 14 and the switch 15 are disposed at positions distant from the LED box 30 and are connected to each LED of the LED box by wiring lines.

Figure 6A:
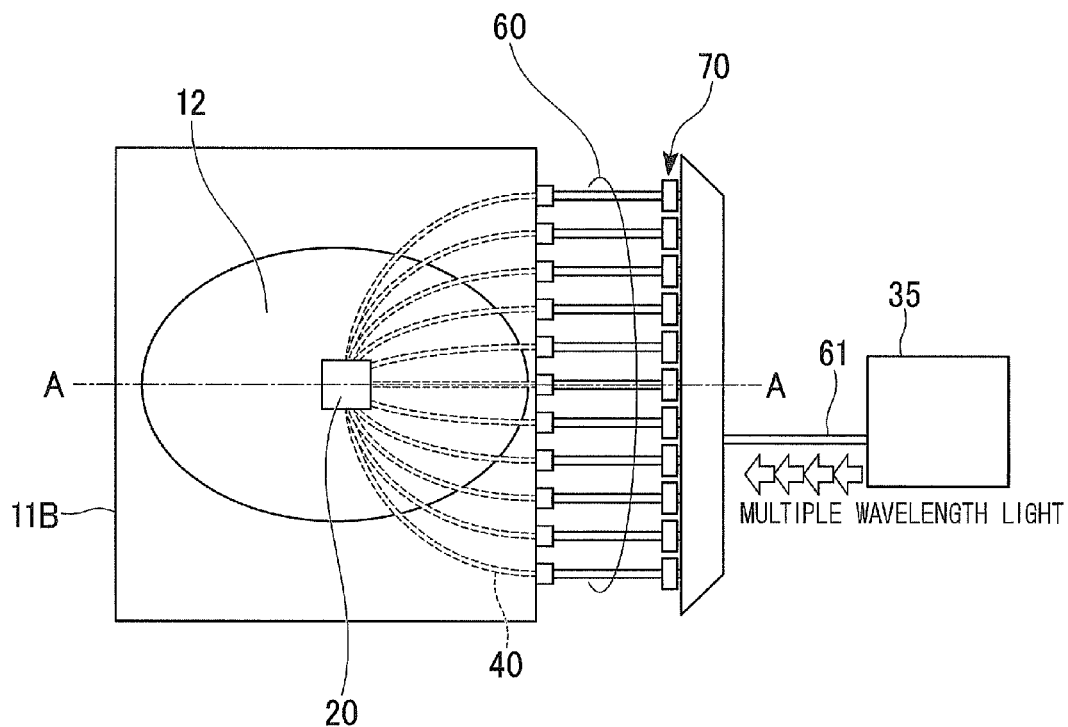
FIGS. 6A and 6B are views illustrating an example of still another configuration of the stage for scanning probe microscopy according to the second embodiment of the invention.
Figure 6B:
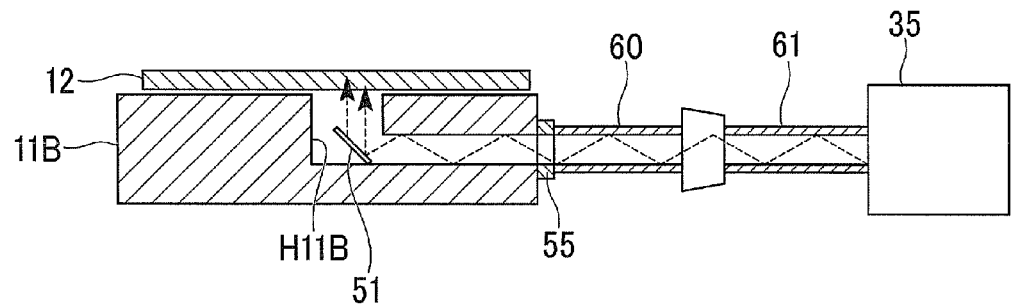

Next, FIGS. 6A and 6B illustrate that a light source box 35, which emits light irradiated onto a sample, is disposed at the position distant from the plate 11B in the same manner as in FIGS. 5A and 5B. FIG. 6A is a top view illustrating a stage for scanning probe microscopy having still another configuration according to the present embodiment, and FIG. 6B is a cross-sectional view taken along the line A-A of FIG. 6A. The light source box 35 is different from the LED box 30 shown in FIGS. 4A to 4C and 5A and 5B. In the light source box 35, a light source which emits natural light having electromagnetic waves (light) with a number of wavelengths is provided instead of an LED. The light with a number of wavelengths that the light source emits is incident on an AWG (Arrayed Waveguide Grating) wavelength demultiplexer 70 as multiple wavelength light by the optical fiber 61. The AWG wavelength demultiplexer 70 is an example of a wavelength divider and divides the incident multiple wavelength light into light having each wavelength (wavelength range region) set beforehand. A switch 71 is provided corresponding to each divided light. Each divided light is incident on the optical waveguide 40 from each optical switch 71 through the corresponding optical fiber 60. The light incident on the optical waveguide 40 is reflected by the mirror 51 and is then emitted from the bottom surface of the sample substrate 12 to the sample 100 through the hole H11B, in the same manner as the configuration shown in FIGS. 4A to 4C.

Although not shown in the drawings, in the light source box 35, the power source 14 and the switch 15 that controls whether or not to supply driving power from the power source 14 are provided at positions distant from the stage for scanning probe microscopy in the same manner as in FIG. 1 or 2. In addition, light having an arbitrary wavelength can be irradiated onto the sample 100 by turning on/off the switch 71 provided for every divided light. In addition, the optical waveguide 40 provided in the plate 11B may be configured inside the plate 11B as shown in FIGS. 6A and 6B or may be provided on a surface of the plate 11B. The AWG wavelength demultiplexer 70 may be provided on the upper surface of the stage in the same manner as in FIGS. 4A to 4C. In this case, light emitted from the light source box 35 is incident on the optical waveguide 40 from a side surface of the plate 11B through the optical connector 55 by the optical fiber 60. A silicon substrate is generally used as the plate 11B. However, a conductor, a semiconductor, and an insulator may also be used as long as they do not allow light to be transmitted therethrough (the same is true for the container 11 shown in FIGS. 1 and 2).

(Applications)

Next, an example of the application using the stages for scanning probe microscopy according to the first and second embodiments will be described with reference to FIGS. 7A to 7C and 8A to 8C. FIGS. 7A to 7C and 8A to 8C illustrate AFM images (surface images of receptor protein on the sample substrate 12 observed by the AFM) indicating results, which are obtained by observing receptor protein reconstructed in an artificial lipid bimolecular membrane, and conceptual views of the receptor protein analyzed by the AFM images. In this application, the observation was performed by using the AFM as an SPM.

Figure 7A:
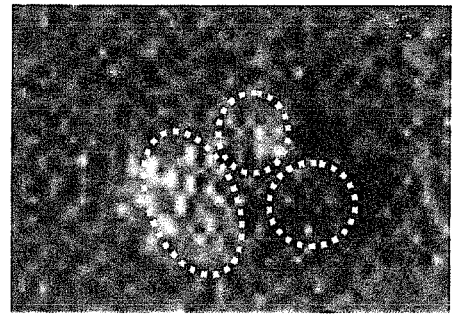
FIGS. 7A to 7C are conceptual views showing the configuration of receptor protein and an AFM image of the receptor protein before irradiation of UV light in an application.
Figure 7B:
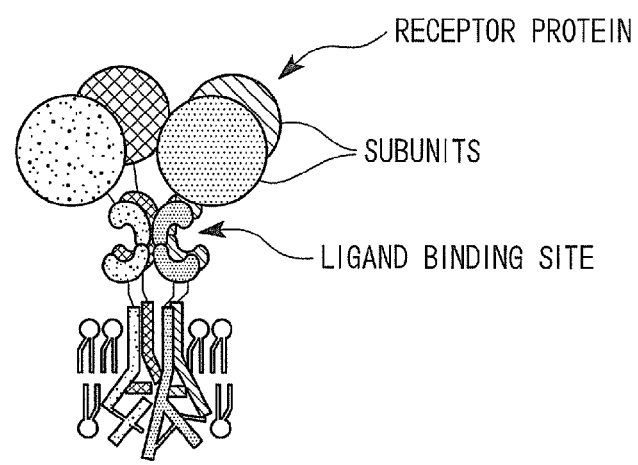
Figure 7C:
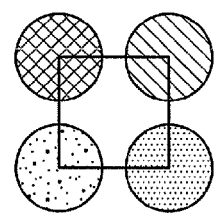
Figure 8A:
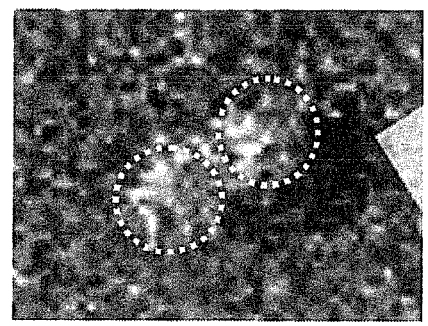
FIGS. 8A to 8C are conceptual views showing the configuration of receptor protein and an AFM image of the receptor protein after irradiation of UV light in an application.
Figure 8B:
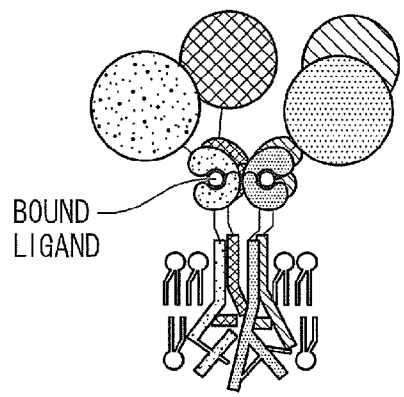
Figure 8C:
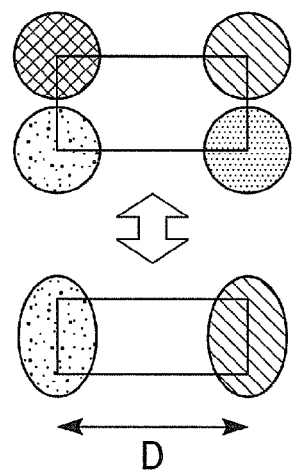

FIGS. 7A and 8A illustrate AFM images (that is, images observed by the cantilever 101 from the upper surface) of receptor protein, FIGS. 7B and 8B illustrate conceptual views obtained when the receptor protein is viewed from the side surface, and FIGS. 7C and 8C illustrate conceptual views obtained when the receptor protein is viewed from the upper surface. In addition, FIGS. 7A to 7C are views illustrating a result of observation before irradiation of UV light, and FIGS. 8A to 8C are views illustrating a result of observation after irradiation of UV light.

The sample 100 is generated by reconstructing receptor protein in the artificial lipid bimolecular membrane, and the reconstructed sample 100 is incubated on mica, which is the sample substrate 12, in temperature and time set beforehand for every sample and is then washed, thereby removing a sample that is not fixed on the sample substrate 12. Then, the sample 100 was observed in the solution 102 using the cantilever 101 of the AFM. In the solution 102, a caged glutamic acid of 2 mM (mol) is dissolved.

As described above, FIGS. 7A to 7C show the AFM image before receiving irradiation of UV light, and FIGS. 8A to 8C show the AFM image after receiving irradiation of UV light. In each of the drawings, a lump that a protruding portion constitutes indicates one molecule of receptor protein. That is, in each of FIGS. 7A and 8A, a portion surrounded by a dotted line is the protruding portion and one molecule of the receptor protein is formed by each protruding portion. In FIG. 7A, one large protruding object and two small protruding objects are observed, and a planar shape including these three protruding objects is a shape similar to a square (approximately square shape).

That is, the structure of the receptor protein shown in FIG. 7A is theoretically a tetramer structure as shown in FIGS. 7B and 7C. Accordingly, subunits of the receptor protein are disposed at the positions symmetrical four times. In the AFM image shown in FIG. 7A, however, four protruding objects are not observed but one large protruding object and two small protruding objects, which are indicated by portions surrounded by dotted lines, are observed. Presumably, this is because the large protruding object surrounded by the dotted line is actually configured to include two small protruding objects (subunits) and accordingly, the distance between the protruding objects is so short as not to be observable with the resolution of the AFM, resulting in being observed as one protruding object (subunit).

Alternatively, it may also be considered that two protruding objects were observed as one protruding object since the protruding object shakes due to heat, for example, while observing the receptor protein of the sample 100. In any case, it is thought that the square shape was observed as shown in FIG. 7A since UV light was not irradiated, the caged glutamic acid which was a caged compound was not dissolved, and the receptor protein was placed under the environment of a non-bioactive state and accordingly, the distance between subunits of the receptor protein was narrow.

Next, in FIG. 8A, two large protruding objects surrounded by dotted lines are observed and a shape including the two protruding objects is a shape similar to a long and narrow elliptical shape. Presumably, this is because the caged glutamic acid in the solution 102 was dissolved, that is, the glutamic acid and a photodissociable protecting group were dissociated from each other by irradiation of UV light and accordingly, the receptor protein was activated, that is, stimulated by the glutamic acid and as a result, the three-dimensional shape between subunits changed and the structure of the receptor protein changed.

Furthermore, regarding observation of the two protruding objects in the AFM image shown in FIG. 8A, it is thought that as shown in FIGS. 8B and 8C, two subunits which form a tetramer were met and accordingly, the distance between the subunits became so small as to be less than the resolution and as a result, two protruding portions were observed as shown in an image view of FIG. 8C. Furthermore, in FIG. 8A it can be observed that a distance D between the two met protruding portions is long compared with that shown in FIG. 7A.

Figure 9:
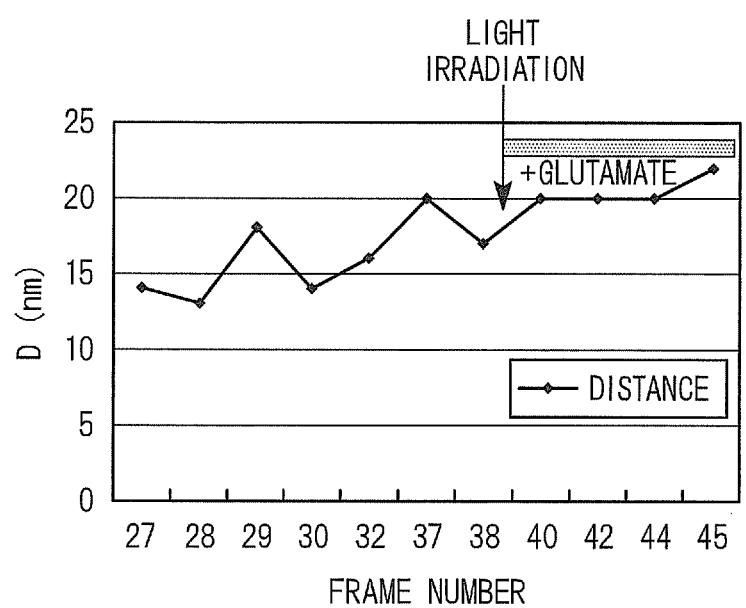
FIG. 9 is a graph showing a change of the membrane structure of receptor protein before and after irradiation of UV light.
Figure 9:
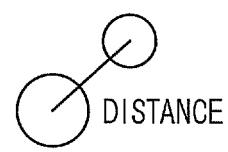

A graph shown in FIG. 9 shows a change in the distance D between the two met protruding objects (structures). A vertical axis indicates the distance D and a horizontal axis indicates the time-series number (that is, equivalent to time) on a screen. Referring to FIG. 9, irradiation of UV light is performed in timing between a thirty-ninth frame and a fortieth frame of an AFM image. As can be seen from the graph shown in FIG. 9, it can be seen that before irradiation of UV light, the distance D between the structures fluctuates, that is, the distance D becomes small or large.

However, after irradiation of UV light, it could be checked that the distance D between the two structures, each of which was viewed as a circular shape, became large apparently and the fluctuation in the distance D was rarely observed. It is thought that this observation result was obtained since the caged glutamic acid in the solution 102 was dissociated by irradiation of UV light and the receptor protein was stimulated by the dissociated glutamic acid and as a result, the three-dimensional structure of the subunit changed as described above.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A stage for scanning probe microscopy for fixing a sample substrate that mounts a sample to be observed thereon and has optical transparency, comprising:
a light irradiation portion,
the light irradiation portion comprising an opening and a light source, and
the opening that is provided below a portion where the sample substrate is fixed and that has an opening area included within the sample substrate in plan view,
wherein light of the light source is irradiated from a bottom surface of the sample substrate onto the sample through the opening; and
the stage for scanning probe microscopy is attached to or detached from the scanning probe microscopy.

2. The stage for scanning probe microscopy according to claim 1,
wherein a light irradiating portion that irradiates the light having a wavelength which affects the sample is provided within the opening.

3. The stage for scanning probe microscopy according to claim 2, further comprising:
a light source portion configured to include a plurality of light sources that emit light components having different wavelengths; and
a waveguide corresponding to light having each wavelength from the light source portion,
wherein each waveguide is combined with the light irradiating portion, and
the light sources are ON/OFF controlled to irradiate the light having a desired wavelength onto the sample.

4. The stage for scanning probe microscopy according to claim 3,
wherein a battery connected to the light source portion by a wiring line is provided, as a power source of the light source portion, at the position distant from the stage for scanning probe microscopy.

5. The stage for scanning probe microscopy according to claim 2,
wherein light is irradiated from the light irradiating portion using an LED as a light source.

6. The stage for scanning probe microscopy according to claim 2,
wherein a battery connected to the light source by a wiring line is provided, as a power source of the light source, at the position distant from the stage for scanning probe microscopy.

7. The stage for scanning probe microscopy according to claim 1,
wherein the sample substrate is a mica substrate.

8. The stage for scanning probe microscopy for fixing a sample substrate that mounts a sample to be observed thereon and has optical transparency according to claim 1, wherein a material having high light reflectance is used as a base material for the stage for scanning probe microscopy.

9. A sample observation method of fixing a sample substrate, which mounts a sample to be observed thereon and has optical transparency, to a stage for scanning probe microscopy and observing the sample with a scanning probe microscopy, comprising:
attaching the stage for scanning probe microscopy to the scanning probe microscopy,
irradiating light of a light source from a bottom surface of the sample substrate onto the sample through an opening that is provided below a portion where the sample substrate is fixed and that has an opening area included within the sample substrate in plan view, wherein
the stage for scanning probe microscopy comprises a light irradiation portion; and
the light irradiation portion comprises the opening and the light source.

10. The sample observation method of fixing a sample substrate, which mounts a sample to be observed thereon and has optical transparency, to a stage for scanning probe microscopy and observing the sample with a scanning probe microscopy according to claim 9, wherein a material having high light reflectance is used as a base material for the stage for scanning probe microscopy.

* * * * *

UNITED STATES PATENT AND TRADEMARK OFFICE
CERTIFICATE OF CORRECTION

| | | |
|---|---|---|
| PATENT NO. | : 8,418,261 B2 | Page 1 of 1 |
| APPLICATION NO. | : 12/994581 | |
| DATED | : April 9, 2013 | |
| INVENTOR(S) | : Kasai et al. | |

It is certified that error appears in the above-identified patent and that said Letters Patent is hereby corrected as shown below:

On the Title Page:

In item (75), the city of residence of inventors Nahoko Kasai and Yuichi Harada should indicate
-- Atsugi-shi, --

On the Title Page:

The first or sole Notice should read --

Subject to any disclaimer, the term of this patent is extended or adjusted under 35 U.S.C. 154(b) by 231 days.

Signed and Sealed this
Twenty-fourth Day of September, 2013

Teresa Stanek Rea
*Deputy Director of the United States Patent and Trademark Office*